INVENTOR
J. J. LUKACS
BY
P. C. Smith
ATTORNEY

Patented Jan. 10, 1950

2,494,479

UNITED STATES PATENT OFFICE 2,494,479

POWER-PLANT SIMULATING DEVICE FOR GROUNDED AIRCRAFT PILOT TRAINERS

Joseph J. Lukacs, New Rochelle, N. Y., assignor to Bell Telephone Laboratories, Incorporated, New York, N. Y., a corporation of New York Application June 29, 1946, Serial No. 680,359

11 Claims. (Cl. 35—12)

This invention relates to an aviation trainer and more particularly to circuits and apparatus for simulating the development of a negative thrust which takes place in an actual airplane when the pilot closes the throttle thus reducing the manifold pressure to a low value and the engine speed is maintained at a high value by the windmilling action of the propeller.

It is an object of the present invention to enable the simulation of the production of negative thrust under the conditions above noted.

A further object of the invention is to enable the simulation of the production of negative thrust due to the windmilling action of a propeller when the engine which drives it is assumed to be disabled.

A still further object of the invention is to enable the simulation of the entire elimination of thrust when the feathering of the propeller driven by a disabled engine is simulated.

These objects are attained by the provision of a motor unit the shaft of which may be moved from a normal position representative of a no-thrust condition in one direction rerepresenative of a positive value of thrust which is caused to increase as the assumed altitude of the flight increases, as the assumed manifold pressure increases due to the opening of the throttle, and as the engine speed increases, and which varies inversely as the assumed true air speed of the flight, and in the other direction represenative of a negative value of thrust which increases as the true air speed increases if the engine is assumed to be disabled but driven by a windmilling propeller and which increases as the manifold pressure decreases below a certain value due to a closure of the throttle while the engine is assumed to be running under its own power.

Provision is also made for controlling the thrust motor unit in a manner representative of an increase in positive thrust when water injection is simulated if the throttle is open and the simulated manifold pressure is above a predetermined value, or when an increase in supercharger blower speed is simulated.

Provision is also made for controlling the thrust motor unit in a manner representative of a decrease in negative thrust to zero if the feathering of the blades of the propeller of a disabled engine is simulated.

Figure 1:
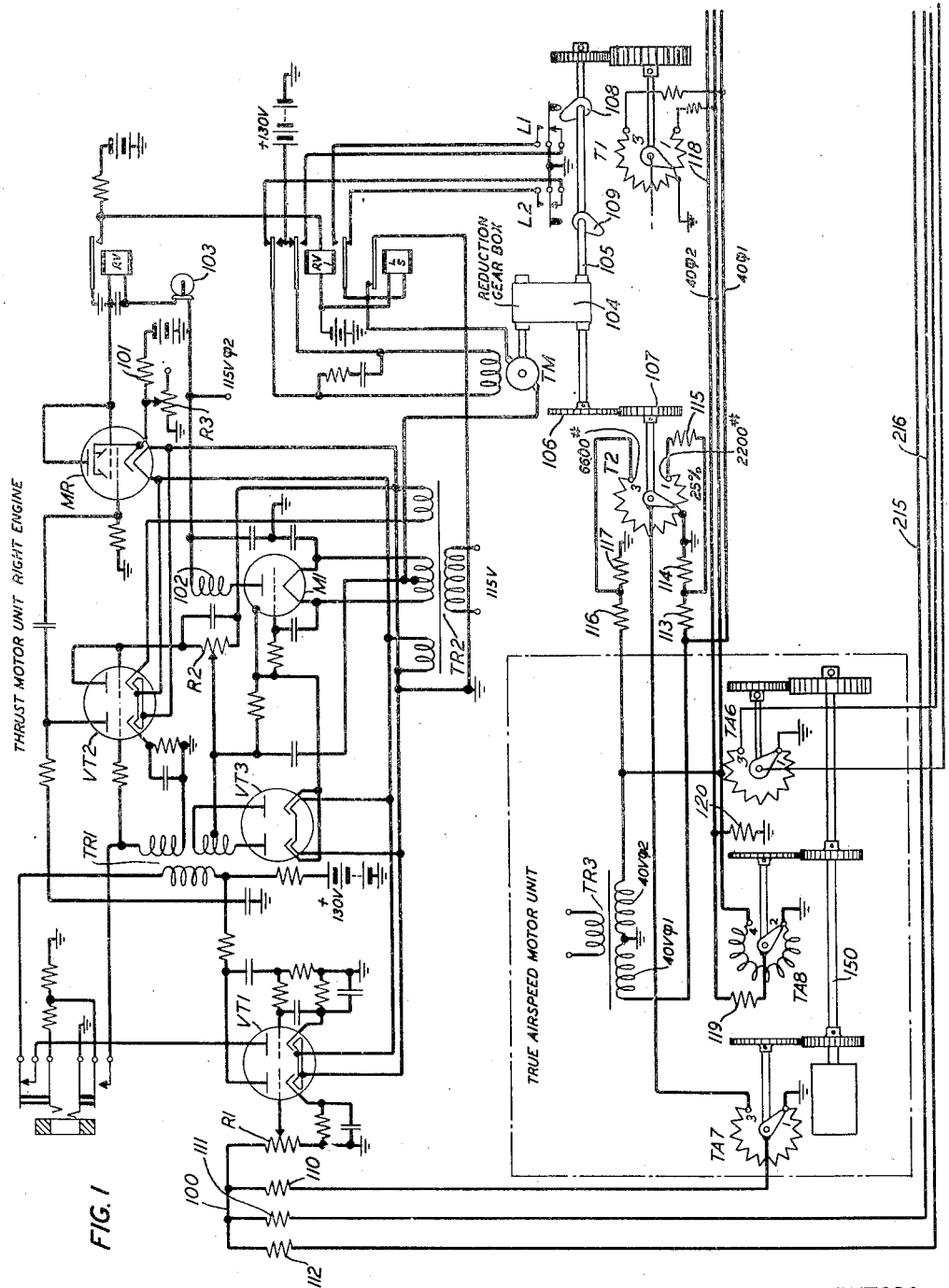
Figure 2:
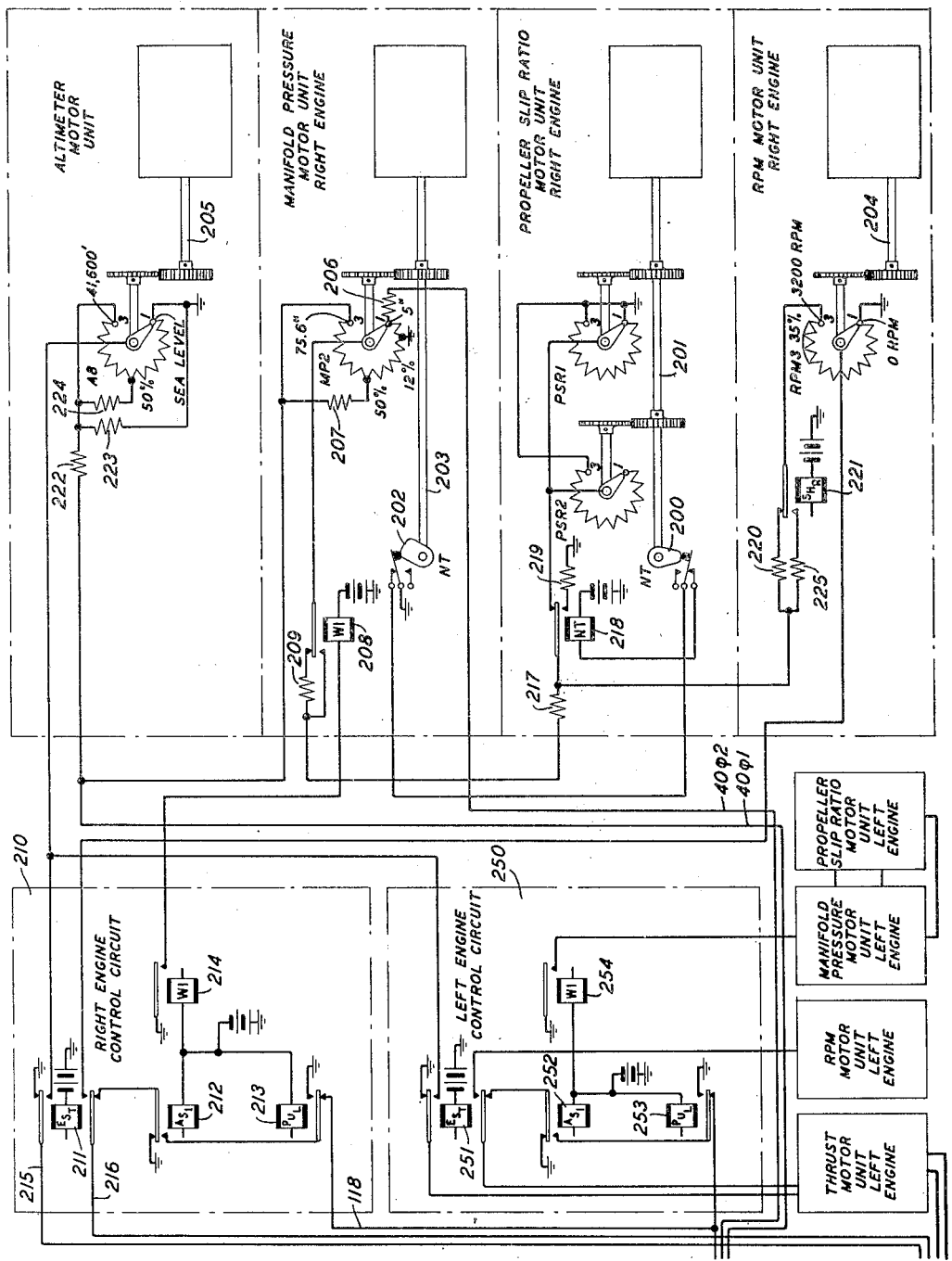

Other features of the invention will become apparent upon the consideration of the following detailed description of the invention when read in connection with the accompanying drawings in which:

Fig. 1 shows portions of the thrust motor unit for simulating the thrust developed by one of the engines of a two-engined airplane and the schematic representation of a portion of the motor unit which simulates the true air speed of an assumed flight; and Fig. 2 shows such portions of the altimeter motor unit, portions of the engine control circuit, manifold pressure motor unit, propeller slip ratio motor unit and RPM motor unit for simulating the operation of the right engine of a two-engined airplane; and portions of the engine control circuit and boxes representing the thrust, manifold pressure, propeller slip ratio and RPM motor units for simulating the operation of the left engine.

For a complete disclosure of the invention, Fig. 2 should be placed to the right of Fig. 1.

The motor units disclosed in Figs. 1 and 2 are each of the type disclosed fully in Patent No. 2,428,767, issued October 14, 1947, to Albert-Davis-Gumley-Holden. To simplify the drawings, the control circuit of only one of these motor units, the thrust motor unit for the right engine of Fig. 1, has been disclosed in detail, some of the other motor units being shown skeletonized to merely show such potentiometers of "variacs" thereof as are necessary for an understanding of the invention, and other motor units, which simulate the functioning of a second engine and which are identical with the motor units more fully shown which simulate the functioning of a first engine, are shown by labeled boxes.

The motor unit disclosed in Fig. 1 comprises a first dual vacuum tube VT1 which serves as a two-stage resistance-coupled amplifier to amplify the control signal applied over control conductor 100 through the gain control rheostat R1, and to apply the amplified signal potential to the primary winding of the step-up input transformer TR1. The amplified signal is impressed from the lower secondary winding of the transformer through the dual diode tube VT3, serving as a full-wave rectifier, upon the control grid of the motor impulsing "thyratron" tube M1 and the signal is also impressed from the upper secondary winding of transformer TR1 upon the control grid of the left unit of the dual tube VT2, which further amplifies the signal and impresses it upon the control grid of the motor reversing tube MR. Grid bias is supplied to the control grid of the "thyratron" tube M1 from the right secondary winding of the filament supply transformer TR2 through the right unit of tube VT2, serving as a rectifier, and such bias is adjusted by the grid bias adjusting rheostat R2. Cathode bias is applied to the cathode of the tube MR from the potential divider comprising the bias adjusting rheostat R3, resistor 101 and battery.

Tube MI upon firing causes the transmission of positive impulses of current through the rotor circuit of the motor TM from the 115-volt phase φ2 source of alternating current. Tube MR upon firing causes the operation of the anode relay RV which in turn causes the operation of the stator circuit reversing relay RV1. The stator winding of the motor TM is energized in a circuit over the contacts of relay RV1 from the source of +130 volts direct current.

Cathode heater current is supplied to the filaments of tubes VT1, VT2, VT3 and MR from the left secondary winding of the filament supply transformer TR2 and heater current is applied to the filament of tube MI from the middle secondary winding of transformer TR2. Anode potential is applied to the anodes of tube VT1 from the source of +130 volt direct current. Anode potential is supplied from the source of 115-volt phase φ2 potential through choke coil 102 to the anode of tube MI, and through the ballast lamp 103 and through the winding of relay RV to the anode of tube MR.

The motor TM through the reduction gear box 104 drives the shaft 105 in one or the other direction at a slow speed dependent upon the operated or unoperated condition of relay RV1 and, through pairs of gears, such as 106, 107, drives the sliders of potentiometers, such as T2. Since the thrust developed by the engines of an airplane affects the angle of attack, the air speed, the rate of turn and indirectly the rate of climb, the trainer is arranged to simulate this by the provision of potentiometers, one of which is illustrated as T1 in Fig. 1, driven by the shaft 105 which potentiometers control motor units operative to simulate indicated air speed as the angle of attack and rate of turn. These motor units also cause the operation of instruments which the trainee may observe and which instruments indicate the simulated air speed, rate of turn and rate of climb. Reference may be had to the application of Davis, Fogarty and Rippere, Serial No. 542,986, filed June 30, 1944; the application of Fogarty and Rippere, Serial No. 622,068, filed October 12, 1945, or the application of R. O. Rippere, Serial No. 715,982, filed December 13, 1946, for illustrations of the effect of simulated thrust on the circuits of a trainer which simulate flight conditions. The shaft 105 also has secured thereto cams 108 and 109 which control the L1 and L2 limit switches to cause the rotation of the motor TM to cease when the sliders of the potentiometers approach the Nos. 1 or 3 terminals of the potentiometer windings. Certain of the motor units also are provided with other cam operated contact sets such as the contact sets NT operable by cam 200 driven by shaft 201 of the propeller slip ratio motor unit and the contact set NT operable by cam 202 driven by shaft 203 of the manifold pressure motor unit.

The engine control circuits for simulating the control of the operation of the right and left engines of an airplane have been schematically disclosed in the dot-dash rectangles 210 and 250 of Fig. 2. Each of these control circuits is of the general character fully disclosed in the application of J. J. Lukacs and W. B. Strickler Serial No. 542,846 filed June 30, 1944; in the application of F. M. Burelbach and J. J. Lukacs, Serial No. 679,069, filed June 25, 1946, and in the application of C. E. Germanton, Serial No. 622,070, filed October 12, 1945. Only four of the relays of each control circuit have been disclosed herein, the EST relay 211 of the control circuit 210 being operable when the starting of the right engine has been simulated, the AS1 relay 212 being operable when air speed of the simulated flight is attained, the PUL relay 213 being operable when the feathered condition of the blades of the propeller driven by the right engine is simulated and the WI relay 214 being operable when the operation of the engine under water injection is simulated. Similar relays 251, 252, 253 and 254 of the control circuit 250 for the left engine have been disclosed.

It will be assumed that the starting and ignition switches (not shown) of the trainer have been operated by the pilot and that as a result the manifold pressure and RPM motor units for each of the simulated engines and the EST relays 211 and 251 of the control circuits for the simulated engines have operated. It will also be assumed that under the control of the flight controls and engine throttle and propeller governor controls for the two engines a condition of cruising flight is simulated. Under this assumed condition the AS1 relays 212 and 252 of the engine control circuits 210 and 250 will be operated, the shaft 203 of the manifold pressure motor unit for the right engine will be set to a position representative of the desired manifold pressure under which such engine should operate for cruising, the shaft 204 of the RPM motor unit for the right engine will be set to a position representative of the desired speed at which the engine should operate for cruising, and the shaft 201 of the propeller slip ratio motor unit for the right engine will be set to a position representative of the propeller efficiency of the engine driven propeller at the assumed speed and with the blade pitch determined by the propeller governor control. The shaft of the RPM, manifold pressure and propeller slip ratio motor units for the simulated left engine will be similarly controlled.

In addition, the shaft 205 of the altimeter motor unit will be set into a position representative of the altitude at which the simulated flight is being conducted and the shaft 150 of the true air speed motor unit will be set into a position representative of the true air speed at which the assumed flight is being flown.

The thrust developed by the propeller of an airplane in flight varies directly with the altitude, directly with the manifold pressure, directly as the square of the cosine of propeller slip ratio, directly as the engine speed, and inversely as the true air speed if the engine is operating under its own power. The thrust thus developed will be positive unless, as later described, the manifold pressure is reduced to a low value by the closure of the throttle when the engine speed is high. If the engine fails while the airplane is in flight, a negative thrust from the propeller will result since power will be consumed by the propeller in driving the associated engine. This negative thrust will vary directly as the air speed and will be reduced to zero if the propeller blades become feathered so that the propeller ceases to rotate.

In the trainer, the thrust developed by each propeller is determined by the position of the shaft of the thrust motor unit of the simulated engine as determined by the value of the signal potential applied to the signal input conductor of such unit. Normally with the simulated engine not running, the sliders of all potentiometers of the thrust motor unit will be positioned at the ground tap points on the potentiometer windings which are the 25 per cent resistance points of the windings away from the No. 1 winding terminals. With the slider of the balancing potentiometer T2 thus positioned, ground is applied therefrom to the upper No. 3 terminal of the winding of the true air speed potentiometer TA7, the lower No. 1 terminal of which winding is also connected to ground, whereby ground potential is connected from slider of potentiometer TA7 through resistor 110 to signal input conductor 100. At the same time with the engine not running and the EST relay 211 of the right engine control circuit 210 not operated, ground is applied over the upper back contact of relay 211, over conductor 215 and through resistor 111 to signal input conductor 100 and with the ASI relay 212 unoperated, representative of a stationary condition of the flight, ground is applied over the upper back contact of relay 212, over the lower back contact of relay 211, over conductor 216 and through resistor 112 to signal input conductor 100. The signal input conductor 100 will thus be at ground potential and the motor TM of the thrust motor unit will not be able to operate to move the sliders of potentiometers away from their normal positions. The same normal condition exists for the thrust motor unit for the left engine.

To simulate the cruising flight condition hereinbefore assumed, the starting of the engine is simulated resulting in the operation of the EST relays 211 and 251 of the engine control circuits and the throttle and propeller governor controls are set to the required positions thereby causing the operation of the manifold pressure motor unit to move the slider of potentiometer MP2 to a position away from the No. 1 terminal of its winding and the operation of the RPM motor unit to move the slider of the potentiometer RPM3 away from the No. 1 terminal of its winding. At this time the sliders of the potentiometers PSR1 and PSR2 of the propeller slip ratio motor unit will be at positions away from the No. 1 terminals of their windings representative of the propeller efficiency at the assumed engine speed and with the assumed pitch of the propeller blades determined by the propeller governor control. As a further result of the assumed operation of the engine and the operation of the flight controls, the trainer will have simulated a take-off and climb to a desired altitude which will be represented by the movement of the slider of the potentiometer A8 of the altimeter motor unit away from the No. 1 terminal of its winding.

The ASI relays 212 and 252 of the engine control circuits will now be operated representative of the fact that the assumed flight has attained air speed and sliders of the potentiometer TA7 and "variac" TA8 of the true air speed motor unit will be operated to positions representative of the assumed air speed of the flight. With the EST relay 211 and the ASI relay 212 now operated, ground at their upper back contacts is disconnected from the signal input conductor 100 of the thrust motor unit for the right engine and ground is similarly removed at the back contacts of the EST relay 251 and ASI relay 252 from the signal input conductor of the thrust motor unit for the left engine.

The upper 88 per cent of the manifold pressure potentiometer MP2 is at this time energized by potential of phase $\varphi 1$ over a circuit extending through the left half of the divided secondary winding of transformer TR3, over the 40$\varphi 1$ bus-bar and through the upper 88 per cent of the potentiometer winding to ground. The lower 12 per cent of the winding is energized by potential of phase $\varphi 2$, over the circuit extending through the right half of the divided secondary winding of transformer TR3, over the 40$\varphi 2$ bus-bar, through resistor 206 and thence through the lower 12 per cent of potentiometer winding to ground. With the potentiometer winding thus energized it will be noted that at low manifold pressures when the slider of the potentiometer is below the ground tap position, potential of phase $\varphi 2$ will be derived at the slider and that at higher values of manifold pressure when the slider is above the ground tap position, potential of phase $\varphi 1$ will be derived at the slider. The upper half of the potentiometer winding is shunted by resistor 207 so that as the slider moves from the ground tap position to the middle tap position in response to the opening of the engine throttle and the consequent increase in manifold pressure, the phase $\varphi 1$ potential at the slider will increase at one rate but as the slider moves from the mid-tap position to the No. 3 terminal of the winding in response to a further increase in throttle opening the phase $\varphi 1$ potential will increase at a slower rate.

The potential derived at the slider of potentiometer MP2 is applied over the back contact of the WI relay 208 and through resistor 209 if it be assumed that water injection is not being used, thence through resistor 217 to ground over two parallel paths. One of these paths extends over the back contact of the negative thrust (NT) relay 218 associated with the propeller slip ratio motor unit, to the sliders of potentiometers PSR1 and PSR2 and thence through the windings of such potentiometers to ground. The No. 3 terminal of the winding of potentiometer PSR2 and both terminals of the winding of potentiometer PSR1 are connected to ground and therefore the resistance of this path will vary approximately as the square of the cosine of the propeller slip ratio factor. The other of the parallel paths extends through resistor 220 over the back contact of the SHR relay 221, it being assumed that at this time the supercharger blower speed control is set for a low speed operation of the blower in which position relay 221 is unoperated, and thence through the winding of the RPM potentiometer RPM3 to ground.

A potential is thus derived at the slider of potentiometer RPM3 which, as the throttle opens to increase the manifold pressure, will increase as the manifold pressure increases, will vary directly with the square of the cosine of the propeller slip ratio and will increase directly as the engine speed increases until the engine speed reaches a value of about 2800 revolutions per minute. Above this engine speed an increase in engine speed up to the maximum of 3200 revolutions per minute is ineffective to increase the potential since the last 35 per cent of the winding of potentiometer RPM3 is short-circuited. This derived potential is now applied from the slider of potentiometer RPM3 over the lower front contact of the EST relay 211 to conductor 216, and thence through resistor 112 to the signal input conductor 100 of the thrust motor unit.

At the same time the winding of the altimeter potentiometer A8 is energized by potential of phase $\varphi 1$ which is applied from the 40$\varphi 1$ bus-bar through resistor 222 and thence in parallel through resistor 223 and through the winding of potentiometer A8 to ground, whereby a potential of phase $\varphi 1$ which increases as the altitude of the simulated flight increases, is applied from the slider of potentiometer A8, over the upper front contact of the EST relay 211, over conductor 215 and through resistor 111 to signal input conductor 100. It will be noted that with the last half of the winding of potentiometer A8 shunted by the resistor 224, the potential derived at the slider will increase at one rate until an altitude of about 20,800 feet is attained and will thereafter increase at a slower rate until the ceiling of the assumed flight or 41,600 feet is attained.

The summation of these phase $\varphi 1$ potentials is amplified by the amplifier tube VT1 of the thrust motor control circuit to transmit impulses through the rotor circiut of the motor TM over a circiut which may be traced from the 115-volt source of phase $\varphi 2$ potential, through choke coil 102, over the anode-cathode path through tube M1 to the mid-point tap of the middle secondary winding of transformer TR2, through the rotor circuit of the motor TM, over the back contact of the LS relay and thence to ground. The motor reversing tube MR will not fire in response to the phase $\varphi 1$ input signal since this signal will appear as a phase $\varphi 1$ potential on the control grid of such tube which will be out of phase with the anode potential of phase $\varphi 2$ applied from the 115-volt phase $\varphi 2$ source through ballast lamp 103 and the winding of the RV relay. Relay RV will therefore not be operated and consequently relay RV1 will not be operated and the stator winding of the motor TM will therefore be energized in a circuit from the +130-volt source of direct current, over the inner upper back contact of relay RV1, through the stator winding of the motor, over the upper back contact of relay RV1 and over the normal contacts of limit switch L2 to ground. With the stator and rotor circuits of the motor TM thus energized the motor TM will now, through the reduction gear box 104, rotate the shaft 105 at a slow speed in a direction representative of a positive increase in thrust as will be represented by the movement of the slider of the balancing potentiometer T2 away from the ground tap terminal of its winding toward the No. 3 terminal of its winding.

The portion of the winding of potentiometer T2 between the No. 1 terminal and the ground tap is energized by potential of phase $\varphi 1$ applied from the junction point between resistors 113 and 114 of the potential divider connected between the 40$\varphi 1$ bus-bar and ground, through resistor 115 and the first 25 per cent of the potentiometer winding to ground, and the portion of the winding of the potentiometer between the No. 3 terminal and the ground tap is energized by potential of phase $\varphi 2$ applied from the junction point between resistors 116 and 117 of the potential divider connected between the 40$\varphi 2$ bus-bar and ground, through the upper 75 per cent of the potentiometer winding to ground.

As the slider of potentiometer T2 is moved by the motor TM of the thrust motor unit toward the No. 3 terminal of the potentiometer winding as previously described, a phase $\varphi 2$ potential of increasing value is applied from such slider through the winding of the true air speed potentiometer TA7 to ground whereby a phase $\varphi 2$ potential which increases as the true air speed increases is derived at the slider potentiometer TA7 and is applied as a balancing potential through resistor 110 to the signal input conductor 100.

As this phase $\varphi 2$ potential increases the phase $\varphi 1$ signal potential is balanced out to an increasing degree and the motor TM will gradually slow down until when the phase $\varphi 2$ balancing potential reaches a value sufficient to balance the phase $\varphi 1$ potential, the motor will stop. Since the balancing potential of phase $\varphi 2$ is varied in accordance with the true air speed, the position to which the shaft 105 is adjusted will be varied inversely with the true air speed.

Should the SHR relay 221 be now operated representative of the operation of the supercharger blower control to a position in which the supercharger blower is run by the engine at its high speed, the 2198-ohm resistor 225 is substituted for the 1860-ohm resistor 220 in the circuit path extending through the winding of potentiometer RPM3 whereby the potential derived at the slider of such potentiometer is increased and the shaft 105 of the thrust motor unit is operated in a direction representative of a further increase in thrust as would result in an actual airplane when the speed at which the supercharger blower is operated is increased.

In an actual airplane, the power output of an engine may be increased if water is injected into the fuel mixture as it passes into the intake manifold. This is simulated in the trainer by the operation of the WI relay 208 associated with the manifold pressure motor unit, under the control of the WI relay 214 of the engine control circuit 210. The latter relay is operated in response to the operation of a water injection switch by the pilot as disclosed in my copending application Serial No. 687,471 filed concurrently herewith. When relay 208 is operated the 100-ohm resistor 299 is eliminated from the previously traced circuit over which potential derived at the slider of the manifold pressure potentiometer MP2 was applied through resistor 112 to the signal input conductor 100 of the thrust motor unit. As a consequence the potential of phase $\varphi 1$ applied to conductor 100 is increased whereby the shaft 105 of the thrust motor unit is operated in a direction representative of a further increase in thrust as would result in an actual airplane when water injection is being used.

It may be stated at this time that the thrust motor unit for the left engine functions in the manner about described in response to the left engine control circuit 250, to the altimeter and true air speed motor units of the trainer and to the left engine RPM, manifold pressure and propeller slip ratio motor units. The altimeter motor unit controls the thrust motor unit for the left engine over a branch of the circuit from the slider of potentiometer A8, and the upper front contact of the EST relay 251 of the left engine control circuit 250. The true air speed motor unit controls the thrust motor unit for the right engine by a potentiometer of the thrust motor unit for the left engine corresponding to potentiometer T2 and by a potentiometer TA6 driven by the shaft 150 of the true air speed motor unit.

It will now be assumed that while the engine of an actual airplane is operating at a high speed, the pilot closes the throttle. The closing of the throttle reduces the manifold pressure to a low value so that the engine develops less power than would be required to maintain the engine speed then determined by the setting of the propeller governor. As a result the engine speed will be maintained by the windmilling action of the propeller thereby causing the production of a negative value of thrust since now the propeller is consuming rather than producing thrust.

In the trainer this condition is simulated by the provision of the negative thrust (NT) contact set in the propeller slip ratio and manifold pressure motor units and by the connection of phase $\varphi 2$ potential through resistor 206 and the first 12½ per cent of the winding of manifold pressure potentiometer MP2. The value of resistor 206 is so selected that when the slider of the potentiometer is at the No. 1 terminal of the winding the shaft of the manifold pressure motor unit will be in a position representative of a manifold pressure of about 5 inches of mercury.

If the pilot in the trainer should now close the throttle, the shaft 203 of the manifold pressure motor unit will be operated in a direction representative of a reduction in manifold pressure and if the throttle is completely closed the shaft will rotate to a position in which cam 202 closes the contacts of the associated NT switch and will rotate the slider of potentiometer MP2 to a position between the ground tap and the No. 1 terminal of the potentiometer winding. The simulated effect of the operation of a throttle has been fully set forth in the Lukacs-Strickler application, in the Burelbach-Lukacs application and more particularly in the Germanton application hereinbefore referred to and a detailed disclosure and description of the manner in which the manifold pressure motor unit functions in response to throttle control is not deemed to be necessary herein. It may be said however that the closure of the throttle is instrumental in moving the slider of a rheostat in such a manner as to reduce the potential applied to the control conductor of the manifold pressure motor unit so that the control tubes and balancing potentiometer of such unit function in the manner described in connection with the operation of the thrust motor unit of Fig. 1 to rotate the shaft 203 in the direction representative of the reduction in manifold pressure. As a further result the shaft 201 of the propeller slip ratio motor unit will be operated into a position in which the cam 200 will close the contacts of the associated NT switch. With both of the NT switches thus operated the circuit of the NT relay 218 is closed resulting in the substitution of the 480-ohm resistor 219 for the resistance of the propeller slip ratio potentiometers PSR1 and PSR2 in the branch path previously traced to which potential from the slider of the manifold pressure potentiometer MP2 is applied.

As the slider of the manifold pressure potentiometer MP2 moves toward the No. 1 terminal of its winding, the phase $\varphi 1$ potential applied therefrom to signal input conductor 100 of the thrust motor unit becomes reduced whereupon the phase $\varphi 2$ potential applied to conductor 100 from the slider of the thrust potentiometer T2 overbalances the phase $\varphi 1$ potential and consequently the shaft 105 is driven by the motor TM in a direction representative of a reduction in thrust.

When the slider of potentiometer MP2 reaches a point on the winding thereof energized by phase $\varphi 2$ potential, phase $\varphi 2$ potential will be applied over the circuit previously traced over the contacts of relay 209, through resistor 217 and in parallel over the front contacts of relay 218 and through resistor 219 to ground and either through resistor 220 or 225, over a contact of relay 221 and through the winding of potentiometer RPM3 to ground. Since it is assumed that the engine speed is high the phase $\varphi 2$ potential now derived at the slider of potentiometer RPM3 and applied therefrom over the lower front contact of the EST relay 211 and over conductor 216 through resistor 112 to signal input conductor 100 of the thrust motor unit will augment the phase $\varphi 2$ potential applied from the slider of the balancing potentiometer T2 of the thrust motor unit and as a consequence the phase $\varphi 1$ potential applied to conductor 100 from the slider of altimeter potentiometer A8 will be overbalanced and the shaft 105 will continue to rotate in a direction representative of a reduction in thrust. The slider of potentiometer T2 will thus continue to move towards the No. 1 terminal of its winding, past the ground tap position until the balancing potential of phase $\varphi 1$ now applied from such slider to conductor 100 balances the phase $\varphi 2$ potential applied to conductor 100 from the slider of the manifold pressure potentiometer MP2. When this balanced potential condition on the conductor 100 is attained the motor TM will stop and the shaft 105 will have been set to a position representative of the negative thrust resulting from the windmilling action of a propeller when the engine is running at a high speed on a closed throttle.

Should the failure of the right engine be simulated and the EST relay 211 be released, ground potential is again applied over its upper back contact, over conductor 215 and through resistor 111 to signal input conductor 100 and with the AS1 relay 212 still operated representative of a condition of flight, potential of phase $\varphi 2$ derived at the junction point between resistors 116 and 117 of the potential divider connected between the slider of "variac" or variable transformer TA8 of the true air speed motor unit and ground, is applied over conductor 118, over the back contact of the PUL relay 213, over the front contact of the AS1 relay 212, over the lower back contact of the EST relay 211, over conductor 216 and thence through resistor 112 to signal input conductor 100.

With only phase $\varphi 2$ potential now applied to conductor 100 through resistor 112 under the control of the true air speed "variac" TA8 and through resistor 110 from the slider of true air speed potentiometer TA7, which potential varies only with the true air speed, the shaft 105 of the thrust motor unit is driven in a direction representative of a reduction of thrust until the slider of potentiometer T2 engages a point on the first 25 per cent of the potentiometer winding and applies a potential of phase $\varphi 1$ to conductor 100 which balances the phase $\varphi 2$ potential applied to conductor 100 under the control of "variac" TA8. At that time the motor TM will stop and the shaft 105 will be set into a position representative of a negative thrust which in an actual airplane would result from the windmilling of the propeller of a disabled engine.

In an actual airplane the pilot would under this condition proceed to feather the blades of the propeller of the disabled engine to remove its drag effect upon the other engine. In the trainer this would be represented by the operation of the PUL relay 213 in response to the operation of the propeller feathering switch by the pilot. When relay 213 operates it removes the phase $\varphi 2$ potential connected as previously described from conductor 118 over the back contact of relay 213, the front contact of relay 212, the lower back contact of relay 211, conductor 216 and through resistor 112 to conductor 100 and connects ground potential through resistor 112 to conductor 100. With phase $\varphi 2$ potential thus removed, the phase $\varphi 1$ potential derived at the slider of balancing potentiometer T2 and applied to conductor 100 through resistor 110 now becomes effective to cause motor TM to drive the slider of potentiometer T2 away from the No. 1 potentiometer winding until such slider engages the ground tap point when ground potential will be applied through resistor 110 to conductor 100 and there being then no potential above ground potential applied to conductor 100 the motor TM will stop. At this time the shaft of the thrust motor unit will be in a position representative of a condition of no thrust output from the right engine in simulation of the cessation of rotation of a disabled engine whose propeller has been completely feathered.

It will be obvious that the thrust motor unit for the left engine may be caused to function in a similar manner in response to the release of the EST relay 251 of the left engine control circuit 250 in simulation of the disabling of the left engine and in response to the operation of the PUL relay 253 of the left engine control circuit 250 in simulation of the feathering of the left engine propeller.

What is claimed is:

1. In an aircraft trainer wherein the operation of an airplane engine is simulated, means for simulating the manifold pressure of an engine, means for simulating the speed of rotation of said engine, a source of current, means for deriving a potential from said source of one or the opposite phase dependent upon whether the simulated manifold pressure is high or low, means for causing said derived potential to increase as the simulated engine speed increases, a motor responsive to said potential, means controlled by said motor for deriving a potential from said source opposite in phase to said first potential, and other means controlled by said motor which will assume a position representative of a negative value of thrust which would result in an airplane from the lowering of the manifold pressure through the closure of the throttle while a high engine speed is maintained by the windmilling action of the propeller.

2. In an aircraft trainer wherein the operation of an airplane engine is simulated, means for simulating the manifold pressure of an engine, means for simulating the speed of rotation of said engine, a source of current, a control conductor, means for deriving a potential from said source of one phase which increases as the manifold pressure increases above a predetermined value and for deriving a potential from said source of the opposite phase which increases as the manifold pressure decreases below the predetermined value, means for causing the derived potential to increase as the simulated engine speed increases and for applying it to said conductor, a potentiometer for deriving a balancing potential from said source of one or the opposite phase and for applying it to said conductor, a motor responsive to an unbalanced potential condition on said conductor for adjusting said potentiometer until the sum of the potentials applied to said conductor becomes zero, and other means controlled by said motor which will assume a position representative of a negative value of thrust which would result in an airplane from the lowering of the manifold pressure through the closure of the throttle while high engine speed is maintained by the windmilling action of the propeller.

3. In an aircraft trainer wherein the operation of an airplane engine is simulated, means for simulating the manifold pressure of an engine, means for simulating the speed of rotation of said engine, a source of current, a control conductor, means for deriving a potential from said source of one or the opposite phase dependent upon whether the simulated manifold pressure is high or low, means for causing said potential to increase as the simulated engine speed increases and to apply said modified potential to said conductor, a potentiometer for deriving a balancing potential of one or the opposite phase from said source, means for modifying said latter potential in accordance with the true air speed of the simulated flight and for applying it to said conductor, a motor responsive to an unbalanced potential condition on said conductor for adjusting said potentiometer until the sum of the potentials applied to said conductor becomes zero, and other means controlled by said motor which will assume a position representative of a negative value of thrust which would result in an airplane from the lowering of the manifold pressure through the closure of the throttle while a high engine speed is maintained by the wind-milling action of the propeller.

4. In an aircraft trainer wherein the operation of an airplane engine is simulated, means for simulating the manifold pressure of an engine, means for simulating the speed of rotation of said engine, a source of current, a control conductor, means for deriving a potential from said source of one or the opposite phase dependent upon whether the simulated manifold pressure is high or low, means for modifying said latter potential in accordance with the propeller efficiency, means for causing said modified potential to increase as the simulated engine speed increases and to apply said modified potential to said conductor, a potentiometer for deriving a balancing potential of one or the opposite phase from said source, means for modifying said latter potential in accordance with the true air speed of the simulated flight and for applying it to said conductor, a motor responsive to an unbalanced potential condition on said conductor for adjusting said potentiometer until the sum of the potentials applied to said conductor becomes zero, and other means controlled by said motor which will assume a position representative of a negative value of thrust which would result in an airplane from the lowering of the manifold pressure through the closure of the throttle while a high engine speed is maintained by the windmilling action of the propeller.

5. In an aircraft trainer wherein the operation of an airplane engine is simulated, means for simulating the manifold pressure of an engine, means for simulating the speed of rotation of said engine, a source of current, a control conductor, means for deriving a potential from said source which varies in accordance with the simulated manifold pressure, means for simulating the application of water injection to said engine, means responsive to said latter means for modifying said derived potential, means for varying said modified potential in accordance with the simulated engine speed and for applying it to said conductor, a potentiometer for deriving a balancing potential of one or the opposite phase from said source, means for modifying said latter potential in accordance with the true air speed of the simulated flight and for applying it to said conductor, a motor responsive to an unbalanced potential condition on said conductor for adjusting said potentiometer until the sum of the potentials applied to said conductor becomes zero, means controlled by said motor which will assume a position representative of the value of the thrust developed by the engine driven propeller, and means for increasing said first derived potential to cause said latter means to assume a position representative of the increase in thrust incident to the use of water injection.

6. In an aircraft trainer wherein the operation of an airplane engine is simulated, means for simulating the manifold pressure of an engine, means for simulating the speed of rotation of said engine, a source of current, a control conductor, means for deriving a potential from said source of one or the opposite phase dependent upon whether the simulated manifold pressure is high or low, means for simulating the operation of a supercharger blower, means responsive to said latter means for modifying said derived potential, means for varying said modified potential in accordance with the simulated engine speed and for applying it to said conductor, a potentiometer for deriving a balancing potential of one or the opposite phase from said source, means for modifying said latter potential in accordance with the true air speed of the simulated flight and for applying it to said conductor, a motor responsive to an unbalanced potential condition on said conductor for adjusting said potentiometer until the sum of the potentials applied to said conductor becomes zero, means controlled by said motor which will assume a position representative of the value of the thrust developed by the engine driven propeller, and means for increasing said first derived potential to cause said latter means to assume a position representative of the increase in thrust incident to the operation of the supercharger blower at a high speed.

7. In an aircraft trainer wherein the operation of an airplane engine is simulated, means for simulating the manifold pressure of an engine, means for simulating the speed of rotation of said engine, means operative representative of the efficiency of the engine driven propeller, a source of current, a control conductor, means for deriving a potential from said source of one or the opposite phase dependent upon whether the simulated manifold pressure is high or low, means for modifying said latter potential in accordance with the propeller efficiency, means for causing said modified potential to increase as the simulated engine speed increases and to apply said potential to said conductor, a potentiometer for deriving a balancing potential of one or the opposite phase from said source, means for modifying said latter potential in accordance with the true air speed of the simulated flight and for applying it to said conductor, a motor responsive to an unbalanced potential condition on said conductor for adjusting said potentiometer until the sum of the potentials applied to said conductor becomes zero, means controlled by said motor which will assume a position representative of the positive value of thrust developed by the engine driven propeller when the manifold pressure is above a predetermined value and which will assume a position representative of the negative value of thrust developed by the engine driven propeller when the manifold pressure is below the predetermined value, and means for rendering the modification of said first derived potential in accordance with the propeller efficiency of no effect when the manifold pressure is below a predetermined value and the propeller effieciency is low.

8. In an aircraft trainer wherein the operation of an airplane engine is simulated, means for simulating the manifold pressure of an engine, means for simulating the speed of rotation of said engine, a source of current, a control conductor, means for deriving a potential from said source of one of the opposite phase dependent upon whether the simulated manifold pressure is high or low, means for causing said potential to increase as the simulated engine speed increases and to apply said modified potential to said conductor, a potentiometer to the end terminals of whose winding oppositely phased potentials derived from said source are applied and to an intermediate terminal of whose winding ground potential is applied, means for modifying the potential derived at the slider of said potentiometer in accordance with the true air speed of the simulated flight and for applying said modified potential to said conductor, a motor responsive to an unbalanced potential condition on said conductor for adjusting said potentiometer until the sum of the potentials applied to said conductor becomes zero, and means controlled by said motor which will assume a position representative of a positive value of thrust developed by the engine driven propeller when the manifold pressure is above a predetermined value, which will assume a position representative of the negative value of thrust developed by the engine driven propeller when the manifold pressure is below the predetermined value and which will assume a position in which the slider of the balancing potentiometer is at the ground terminal of its winding when no thrust is developed by the propeller.

9. In an aircraft trainer wherein the operation of an airplane engine is simulated, a relay operable to simulate the operation of the airplane engine under its own power, a relay operable to simulate the development of air speed due to the engine operation, a source of current, a control conductor, means under the control of said first relay when operated to derive a signal potential of one phase from said source and to apply it to said conductor in simulation of the thrust developed by the engine driven propeller, a balancing potentiometer to the end terminals of whose winding oppositely phased potentials derived from said source are applied, to an intermediate terminal of whose winding ground potential is applied and from whose slider potential is applied to said conductor, a motor responsive to an unbalanced potential condition on said conductor for adjusting said potentiometer until the sum of the potentials applied to said conductor becomes zero, and means controlled by said motor which will assume a position representative of the thrust developed by the engine propeller, said relays when released to represent the normal inoperative condition of the airplane causing the substitution of ground potential for said signal potential whereby said motor is operated under the control of said balancing potentiometer until ground potential is applied to said conductor, whereupon the slider of said balancing potentiometer is returned to the intermediate grounded terminal at which time said latter means assumes a posiion representative of zero thrust.

10. In an aircraft trainer wherein the operation of an airplane engine is simulated, a source of current, a control conductor, a relay operable to simulate the operation of the engine under its own power, means under the control of said relay when operated to derive a potential of one phase from said source and to apply it to said conductor representative of the thrust developed by the engine driven propeller, a potentiometer for deriving a balancing potential of one or the opposite phase from said source and for applying it to said conductor, a motor responsive to an unbalanced potential condition on said conductor for adjusting said potentiometer until the sum of the potentials applied to said conductor becomes zero, means controlled by said motor which will assume a position representative of the thrust developed by the engine driven propeller, means for deriving a potential opposite in phase to said first potential and which varies in accordance with the true air speed of the simulated flight, and means for applying said latter potential to said conductor if said relay is released to represent the disabling of the engine whereupon said motor is controlled to cause said motor operated means to assume a position representative of the negative value of thrust which would result from the driving of a disabled engine of an airplane by the windmilling action of the propeller associated therewith.

11. In an aircraft trainer wherein the operation of an airplane engine is simulated, a source of current, a control conductor, a relay operable to simulate the operation of the engine under its own power, means under the control of said relay when operated to derive a potential of one phase from said source and to apply it to said conductor representative of the thrust developed by the engine driven propeller, a potentiometer for deriving a balancing potential of one or the opposite phase from said source and for applying it to said conductor, a motor responsive to an unbalanced potential condition on said conductor for adjusting said potentiometer until the sum of the potentials applied to said conductor becomes zero, means controlled by said motor which will assume a position representative of the thrust developed by the engine driven propeller, means for deriving a potential opposite in phase to said first potential and which varies in accordance with the true air speed of the simulated flight, means for applying said latter potential to said conductor if said relay is released to represent the disabling of the engine whereupon said motor is controlled to cause said motor operated means to assume a position representative of the negative value of thrust which would result from the driving of a disabled engine of an airplane by the windmilling action of the propeller associated therewith, and a relay operable to discontinue the application of said latter potential to said conductor whereupon said motor is controlled to cause said motor operated means to assume a position representative of zero thrust which would result in an actual airplane by the feathering of the propeller associated with a disabled engine.

JOSEPH J. LUKACS.

REFERENCES CITED

The following references are of record in the file of this patent:

UNITED STATES PATENTS

| Number | Name | Date |
|---|---|---|
| 2,308,566 | Noxon | Jan. 19, 1943 |
| 2,346,838 | Haight | Apr. 18, 1944 |
| 2,366,603 | Dehmel | Jan. 2, 1945 |
| 2,372,741 | Roberts | Apr. 3, 1945 |
| 2,395,477 | Gumley | Feb. 26, 1946 |
| 2,406,836 | Holden | Sept. 3, 1946 |
| 2,428,767 | Albert | Oct. 14, 1947 |
| 2,428,770 | Albert | Oct. 14, 1947 |